United States Patent
Althause et al.

[11] 3,880,529
[45] Apr. 29, 1975

[54] SIGHTING DEVICE

[75] Inventors: Joseph F. Althause, Canoga Park; Albert W. Appel, Inglewood, both of Calif.

[73] Assignee: Hughes Aircraft Company, Culver City, Calif.

[22] Filed: Aug. 16, 1971

[21] Appl. No.: 172,218

Related U.S. Application Data
[63] Continuation of Ser. No. 545,073, April 25, 1966, abandoned.

[52] U.S. Cl............... 356/251; 350/10; 350/96 R; 350/174
[51] Int. Cl...................... G02b 23/10; G02b 27/34
[58] Field of Search............ 356/251; 350/10, 96 R, 350/96 B, 174, ; 250/467; 33/241, 242

[56] References Cited
UNITED STATES PATENTS

| | | | |
|---|---|---|---|
| 683,203 | 9/1901 | Grubb................................. | 356/251 |
| 886,628 | 5/1908 | Netto.................................. | 350/10 |
| 1,302,353 | 4/1919 | Fredrich........................ | 350/10 X |
| 1,931,552 | 10/1933 | Maris............................ | 350/10 X |
| 2,392,979 | 1/1946 | Douden............................ | 250/467 |
| 2,490,091 | 12/1949 | Reardon............................ | 250/467 |
| 2,500,405 | 3/1950 | Fairbank....................... | 350/10 UX |
| 2,633,051 | 4/1953 | Davis................................. | 356/251 |
| 2,852,974 | 9/1958 | Nobles............................... | 356/251 |
| 3,257,904 | 6/1966 | Scidmore et al..................... | 350/10 |
| 3,320,671 | 5/1967 | Rickert et al...................... | 350/10 |

FOREIGN PATENTS OR APPLICATIONS

| | | | |
|---|---|---|---|
| 130,048 | 7/1919 | United Kingdom................. | 356/251 |
| 739,149 | 10/1955 | United Kingdom | |

*Primary Examiner*—Ronald L. Wibert
*Assistant Examiner*—F. L. Evans
*Attorney, Agent, or Firm*—Rafael A. Cardenas; William H. MacAllister

[57] ABSTRACT

A sighting device for aiming at a target under various ambient light level conditions is disclosed. An operator sights a target along a first housing portion. A second housing portion contains a reticle, a window through which ambient light, if present, is directed to illuminate the reticle, and a self-luminous source coupled to also illuminate the reticle. A dichroic beam splitter having a surface coated with a material to reflect red wavelengths and transmit all other visible wavelengths is positioned angularly to the line of sight in the first housing. A mirror is positioned to reflect a virtual image of the reticle to the dichroic beam splitter which re-reflects the red wavelengths to the operator's eye such that the reticle image appears to be superposed on the target image. Wavelengths of the target image other than red pass through the beam splitter to the operator to provide contrasting color reticle and target image indication.

7 Claims, 14 Drawing Figures

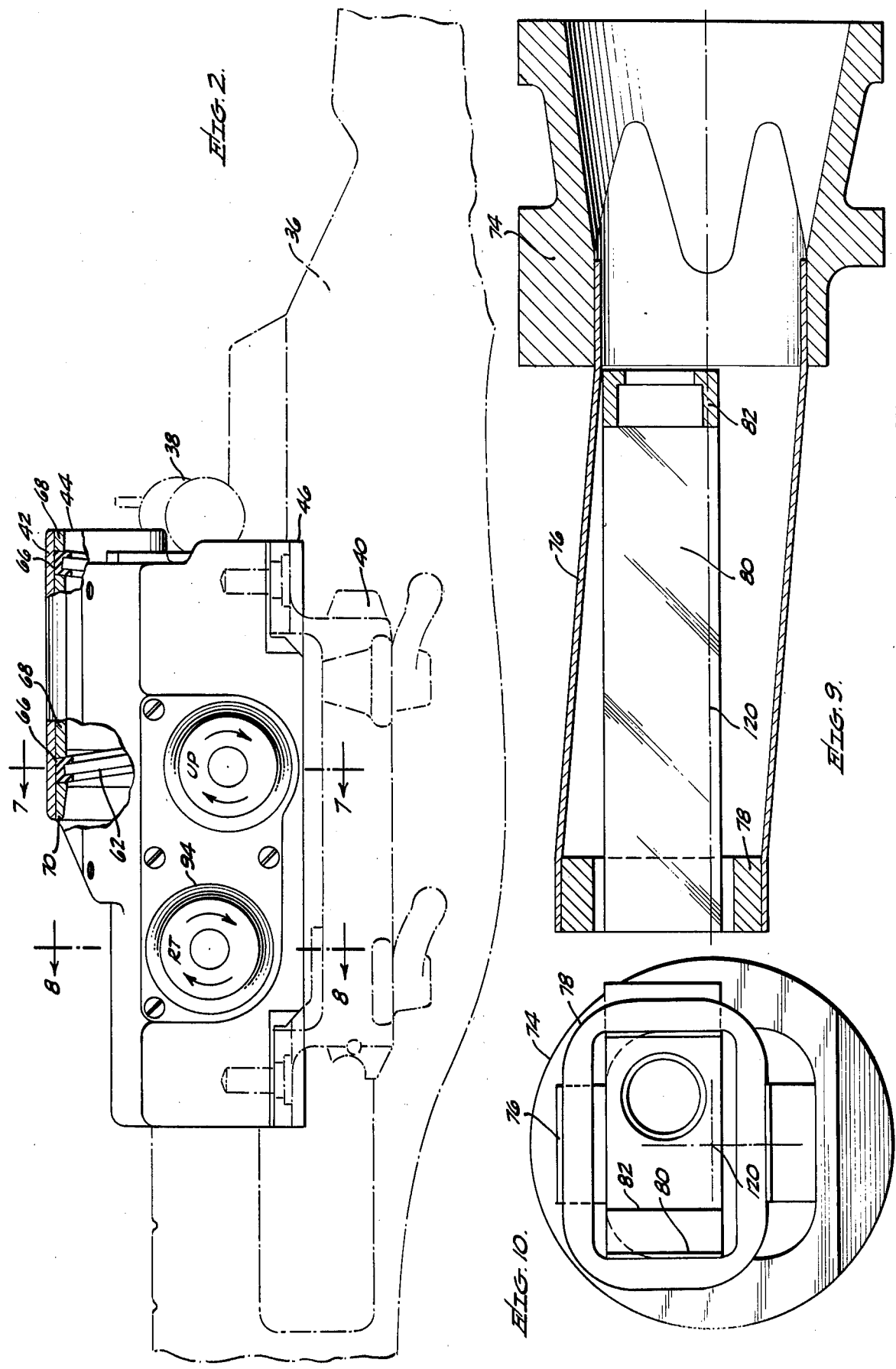

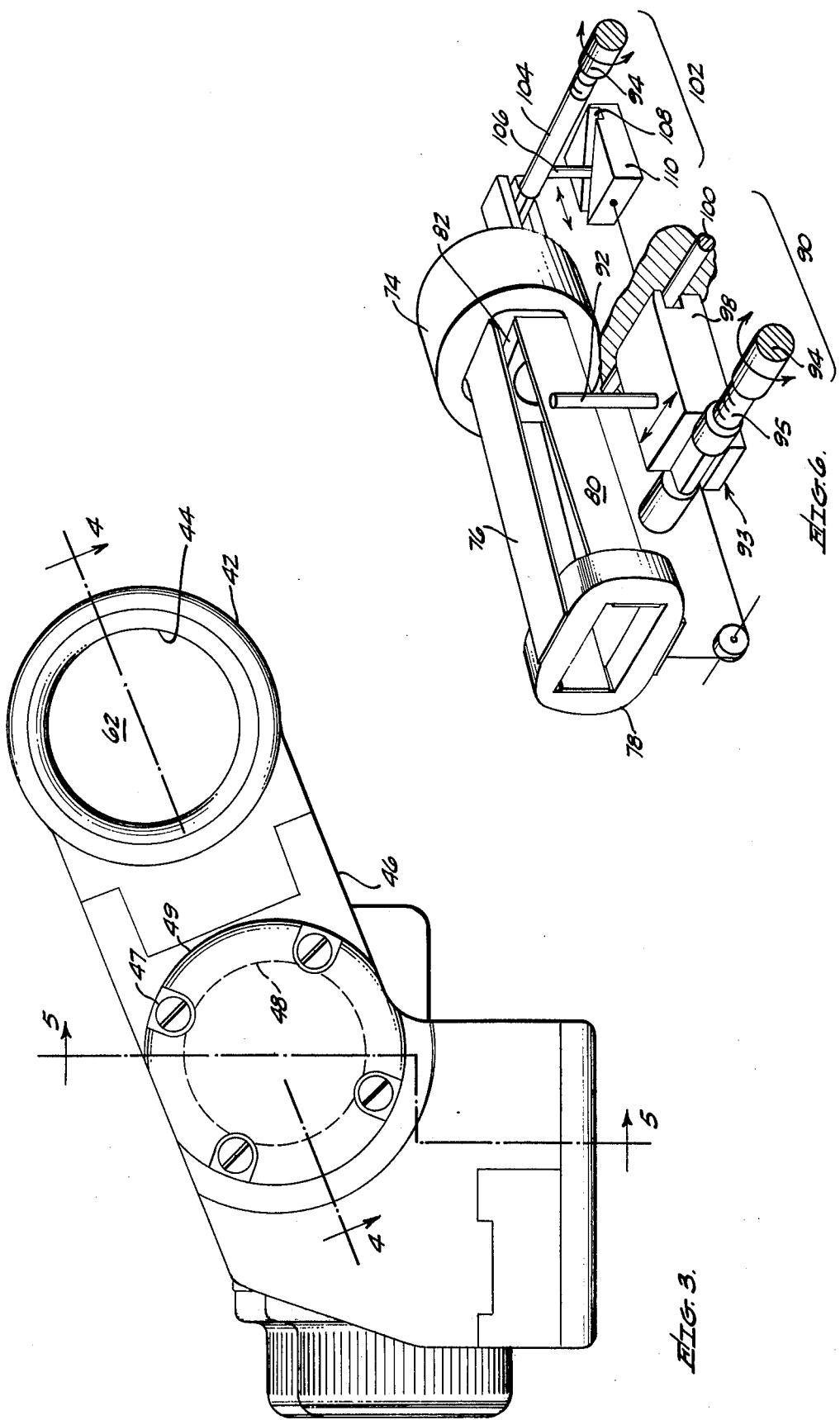

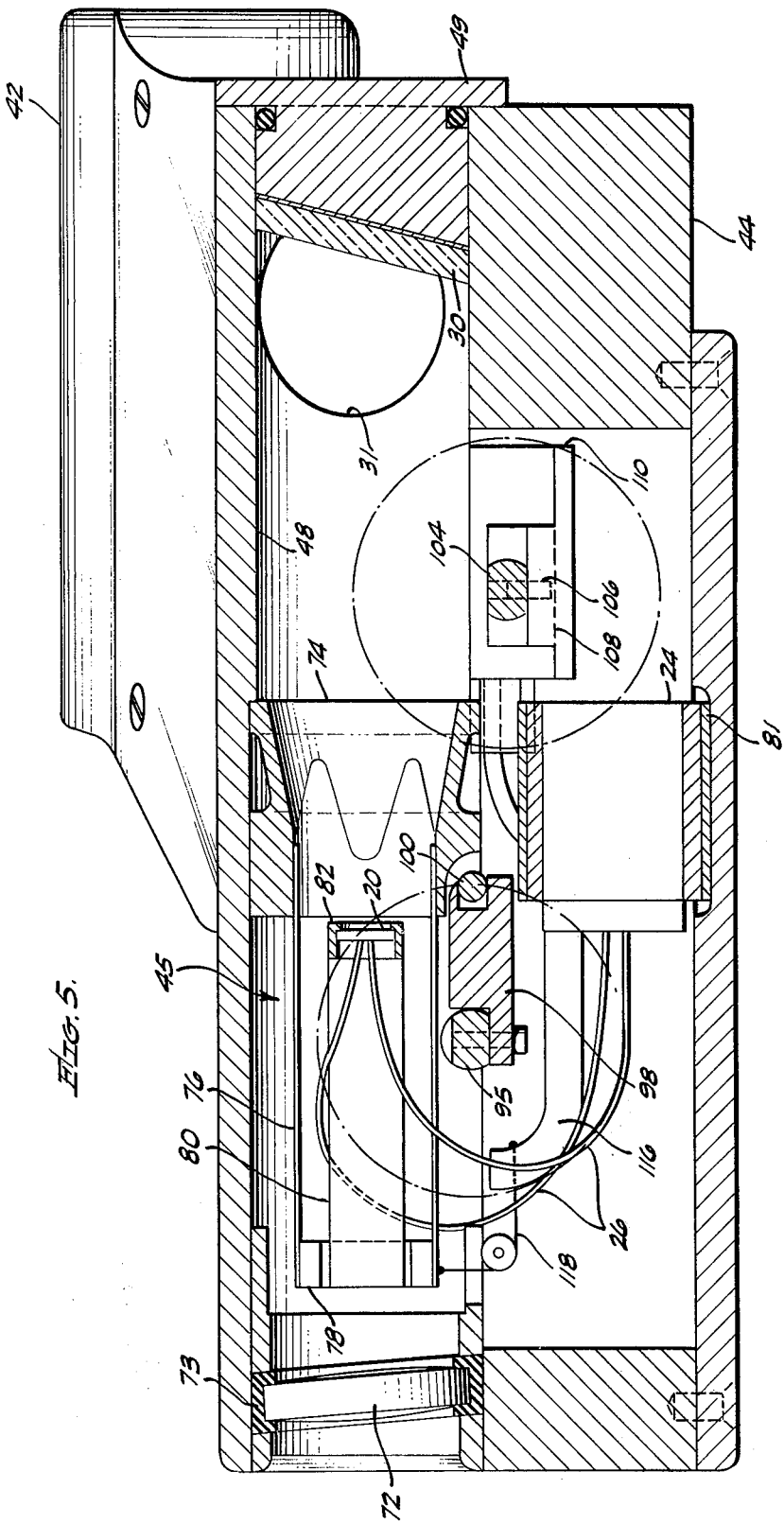

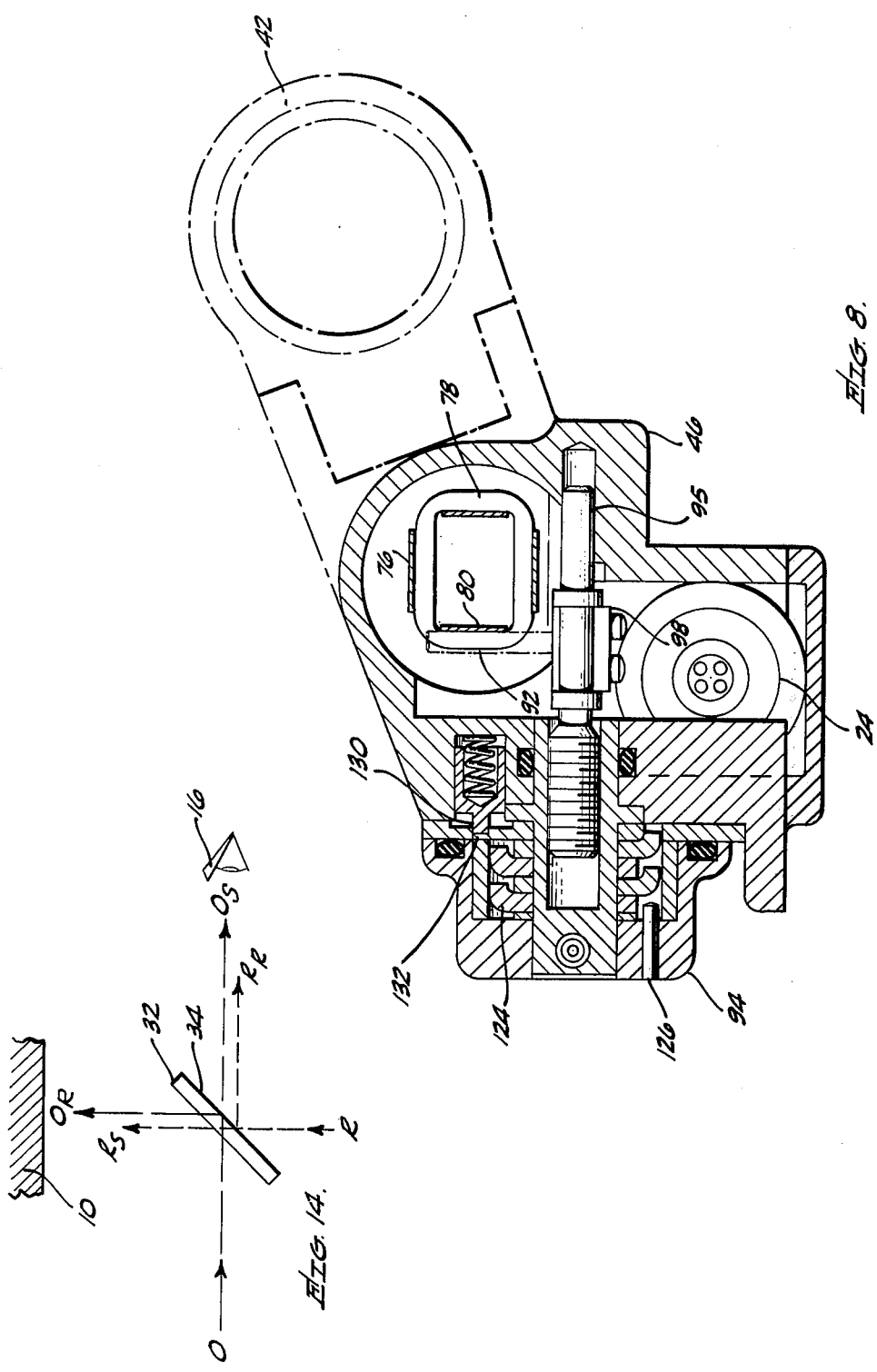

SIGHTING DEVICE

This application is a continuation of application Ser. No. 545,073 filed Apr. 25, 1966, now abandoned.

This invention relates to a sighting device and more particularly to a sighting device for establishing the line of sight of a small arm or weapon under both daylight and night light conditions.

For many years a need has existed for a sighting device for standard small arms such as a rifle which may be used by relatively untrained individuals to sight or aim the rifle with the same relative accuracy as that of a trained individual. Additionally, a need has existed for a sighting device which enables the weapon to be at a nearly totally black object appearing against a nearly totally black background. The black metal ramp sight found on most conventional small arms has proven totally inoperative under such marginal light conditions; thus predicating the development of a sighting device which can superimpose a sight pattern against such a background without affecting the dark adapted vision of the operator and without emanating light of a magnitude or wavelength which can be easily detected.

Therefore, one object of the present invention is to provide an improved sighting device which may be used by untrained individuals to sight a small arm with a high degree of accuracy.

A further object of the present invention is to provide an improved sighting device which may be used under substantially all daylight and night light conditions.

A still further object of the present invention is to provide a sighting device which includes a self luminous source having a light output of a wavelength not detrimental to the dark adapted vision of an operator.

In general, in its preferred form the present invention comprises a housing member adapted to be affixed to a small arm and having a first part defining a field of view in which an operator sights an object to establish a line of sight. A reticle is supported in a second part of the housing out of this field of view; and is illuminated by two light sources, one coupled to the reticle by a window and the other originating within the device. An optical system locates the image of the reticle in this field of view so that it appears to the operator to be superimposed upon any object chosen as the line of sight of the small arm.

Other advantages of the invention will hereinafter become more fully apparent from the following detailed description of a preferred embodiment of the invention when considered in conjunction with the accompanying drawings throughout which like reference characters indicate like parts and in which:

FIG. 2 is a side elevational view of a sighting device comprising a preferred embodiment of the present invention and showing its attachment to a portion of a typical small arm such as a rifle which is shown in dashed lines. The sighting device has a portion of the sighting chamber cut away to facilitate correlation of other Figures with this Figure;

FIG. 3 is a front elevational view of the preferred embodiment shown in FIG. 2;

FIG. 5 is a sectional view taken at line 5—5 in FIG. 3;

FIG. 6 is a schematic drawing illustrating in a simplified form the support mechanism for the reticle and the mechanisms for adjusting the position of the reticle in the illumination chamber;

FIG. 8 is an enlarged sectional view through the azimuth control mechanism and taken at line 8—8 in FIG. 2, and showing the first part of the housing in dashed lines;

FIG. 9 is an enlarged sectional view of the reticle support mechanism;

FIG. 10 is a front view of the reticle support mechanism shown in section in FIG. 9;

FIG. 14 is a diagram showing the operation of the beam splitter to filter the light rays from the object and from the image into two components.

Figure 1:
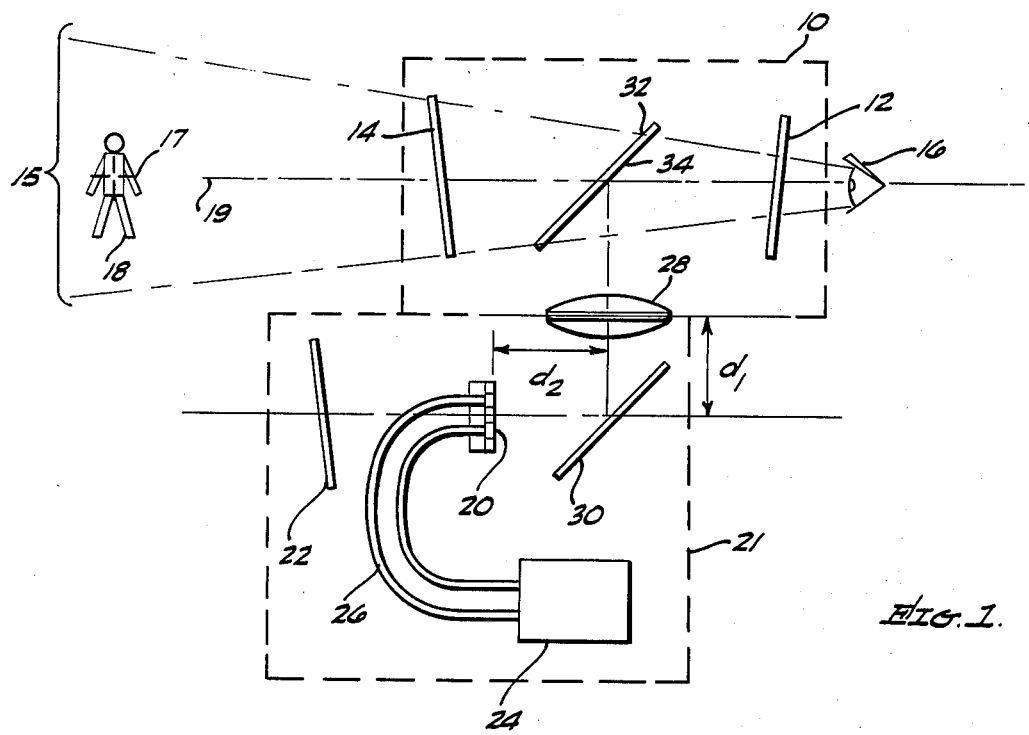
FIG. 1 is a schematic drawing illustrating the critical elements of a sighting device according to the principles of the present invention.

Referring to FIG. 1 the principles of the present invention are embodied in a system including the basic elements of a housing having a first part 10 with windows 12, 14 through which an operator looks to define a field of view 15 and to enable an operator to establish a line of sight 19 for his weapon to a distant object or target 18 a sight picture 17 is located in this field of view. To locate the sight picture 17 in the field of view 15 a reticle 20 located in a second part 21 of the housing is illuminated either through a window 22 by ambient light by a self luminous source 24, and, as shown here, a plurality of fiber optic strands 26 transmit the light output of the self luminous source 24 to the reticle 20. The reticle 20 is positioned at the principal focus of an optic lens 28 having a focal length $d_1 + d_2$ and which for compactness is located at right angles to the reticle 20 with a first surface mirror 30 positioned therebetween. Under illumination through the ambient light window 22 and the self luminous source 24 the mirror 30 develops a virtual image of the reticle 20 which is collimated and magnified by the lens 28 and reflected by a beam splitter 32 positioned in the field of view 15. Thus the beam splitter 32 develops a virtual image 17 of the reticle 20 which appears to the operator to be superimposed upon an object or target in his field of view to establish the line of sight 19 from the weapon to the object. Therefore, so long as operator sees target in field of view placing image of reticle on target by moving the weapon is sufficient to establish line of sight. The target and image of reticle can be located anywhere in the field of view.

The beam splitter 32 has one major surface 34 coated with a light filtering material which reflects those wavelengths of the red portion of the light spectrum and transmits all other wavelengths of the visible portion of the spectrum. This permits the operator to see the object with all light in the red portion of the spectrum filtered therefrom, and with a reticle of reddish color superimposed thereon.

Figure 12:
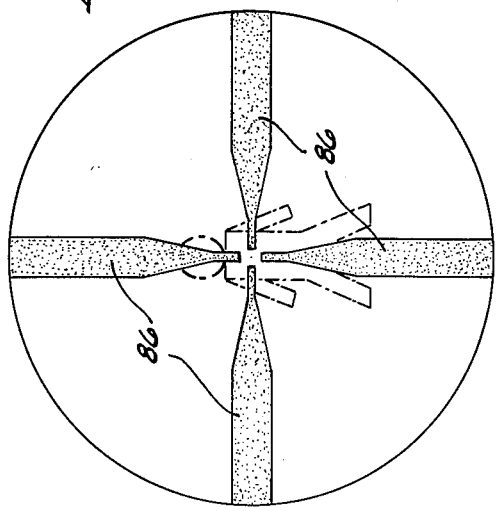
FIG. 12 is an enlarged drawing of the reticle of the preferred embodiment showing a typical sight picture under daylight conditions.
Figure 13:
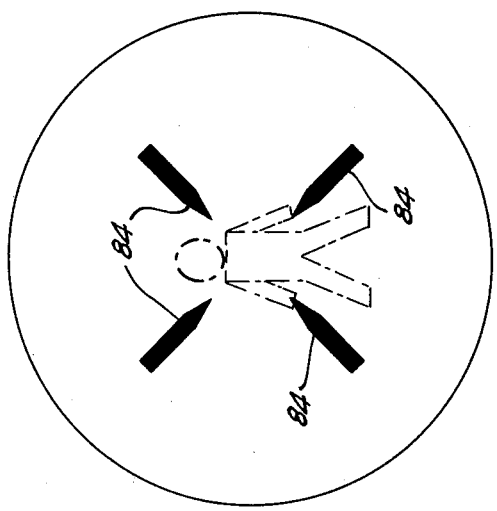
FIG. 13 is an enlarged drawing of the reticle of the preferred embodiment showing a typical sight picture under night light conditions.

The filtering of the light rays from the object or target and from the reticle is illustrated schematically for clarity in FIG. 14. A light ray O from the object contacting the major surface 34 coated with the light filtering material is split into substantially two components $O_R$, $O_S$, which because of the particular reflective properties of the coating chosen for this embodiment represent light having a wavelength in the red portion of the spectrum and light having wavelengths of all the other visible portions of the spectrum, respectively. This coating reflects the component $O_R$ which is substantially dissipated in the housing 10 and transmits the component $O_S$ to the operator's eye 16. In a like fashion, a light ray R from the reticle contacting the major surface 34 is split into substantially two components $R_R$ and $R_S$ with the component $R_S$ transmitted and dissipated in the housing 10 and the component $R_R$ reflected to the operator's eye 16. While the reticle is continuously illuminated by both light sources under daylight conditions and looking at a bright field of view the operator sees in reddish color only that portion of the reticle illuminated by ambient light (FIG. 12) since the intensity of this portion of the reticle appears many times greater than that portion illuminated by the self luminous source. However, under nearly dark conditions the ambient light source for all practical purposes is nonexistent and the portion of the reticle illuminated by the self luminous source appears red in color against the black background (FIG. 13). This contrast of red against black has been chosen since it does not appreciably affect the operator's night adapted vision. However, a different light filtering material may be used if it is desirable to have the image of the reticle appear in a different color.

Figure 4:
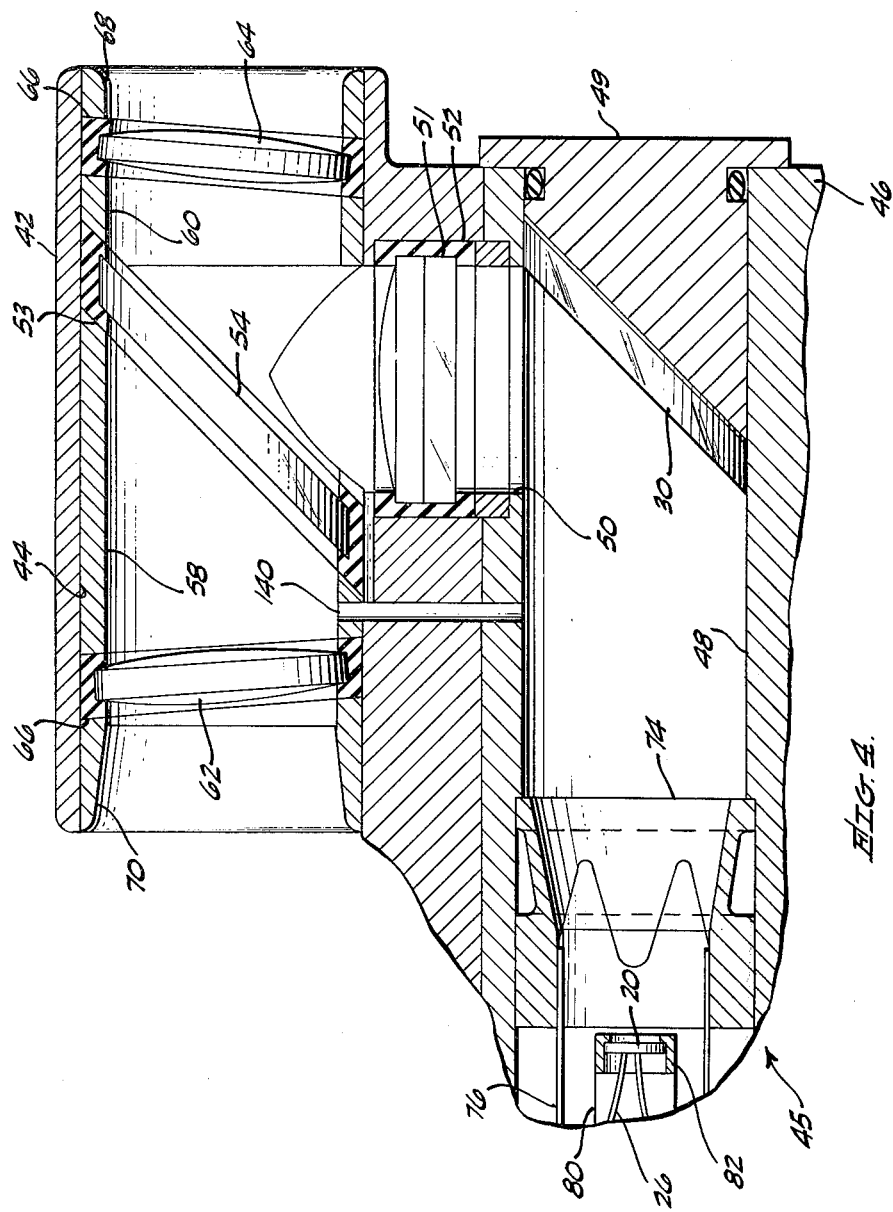
FIG. 4 is a partial sectional view taken at line 4—4 in FIG. 3.

Now that the elements have been described in a general way the following is a description of the detailed structural elements of a preferred embodiment. FIG. 2 shows this embodiment affixed to a small weapon 36 such as a rifle in front of a conventional black iron ramp sight 38. Since it is desirable to have a sight which may be adapted for use with more than one weapon the present sight has been developed with this object in mind and is typically affixed to a weapon with a standard attachment fixture 40. For clarity the rifle 36, the conventional ramp sight 38 and the standard attachment fixture 40 are shown in dashed lines. In addition to FIG. 2, referring to FIGS. 3, 4 and 5, the preferred embodiment comprises a two part casing or housing having a first part 42 including a longitudinal sight chamber 44 located at a position relative to a second part 46 and the longitudinal axis of the rifle to facilitate sighting with the operator's right eye, while providing a relatively unobstructed field of vision for the operator's left eye. The second part 46 includes a longitudinal reticle chamber 48 containing the reticle 20 and a reticle support structure 45 (to be described in detail below) and the mirror 30. The mirror 30 is a conventional first surface mirror which for increased reflectivity of light in the red portion of the spectrum and for increased resistance to environmental conditions has a gold reflective coating. It is positioned in the reticle chamber 48 by bonding it to a 45° surface of a support element 49 which is inserted into one end of the chamber 48 and affixed to the housing by conventional means such as screws 47. Adjacent to the mirror 30 is a continuous bore 50 in both the first and second parts 42, 46 and as shown in FIG. 4 it has a central axis at an angle of 45° with the surface of the mirror 30. This enables the image of the reticle to be reflected through the bore. To collimate and magnify the light rays of the reticle image a conventional achromatic lens 51 having a focal length compatible with the physical dimensions of the sight is positioned by a resilient support and retaining ring structure 52 perpendicular with the central axis of the bore 50.

In line with the mirror 30 and the lens 51 to receive the image of the reticle in the sight chamber 44 is a dichroic beam splitter or filter 54. For resistance to shock loads the beam splitter 54 is supported in a resilient support ring 53 and rigidly positioned with its major surfaces at 45° with the longitudinal axis of the sight chamber 44 by a pair of cylindrical sleeves 58, 60 which are bonded to the chamber.

Inwardly from the ends of the sight chamber 44 are a pair of windows 62, 64 of select plate glass which are typically mounted in a resilient ring 66 and are held in place in the chamber by cylindrical sleeves 68, 70 bonded to the surface of the chamber. To enhance the light transmission of the windows they are typically covered with an interference filter coating such as a highly efficient anti-reflective coating manufactured by Optical Coating Laboratory, Inc., Santa Rosa, Calif. Since such a coating is highly reflective to light in the infrared portion of the spectrum both of the windows are positioned in the chamber at a 4 degrees inclination from the vertical as shown in FIG. 4 so that any light rays in the infrared spectrum are reflected beneath the sight rather than back to the point of origin of such rays. To reduce the possibility of the housing also reflecting light in the infrared portion of spectrum the exterior surface of the housing may be sandblasted, black anodized and covered with a dull non-reflecting epoxy paint.

The end of the reticle chamber 48 opposite from that containing the mirror support element 49 contains the ambient light window 72 which like the windows in the sight chamber 44 is of select plate glass coated with an interference filter coating, resiliently supported by a ring 73, inclined 4° to reflect infrared rays to ground and is positioned in the chamber by cylindrical sleeves. In addition, this ambient light window 72 has one surface frosted to insure even distribution of light in the reticle chamber 48.

As shown enlarged in FIGS. 9 and 10 the reticle support structure 50 includes a cantilever support member 74, a first pair of flat cantilever springs 76 affixed at one end to the support member 74 and supporting at the other end a ring 78. The ring 78 has affixed to it a second pair of flat cantilever springs 80 which extend towards the support member 74 and support at their ends a reticle support frame 82. To be described in greater detail later, the cantilever springs operate similar to pairs of parallel rulers to move the reticle for elevation and azimuth adjustments of the sight picture.

The self luminous source 24, FIG. 5, is located in the second part 46 in a resilient support 81 and may be a radioactive source such as tritium activated light source manufactured by U.S. Radium Corporation, North Hollywood, Calif. or any other source such as a small battery and light bulb with a central switch interposed between them. The light energy developed by this source is typical in the range of 750 microlamberts and is conveyed or transmitted by the plurality of fiber optic strands 26, which for increased resistance to shock loads may be of a plastic material, such strands being manufactured by Poly-Optic Systems, Inc., Paramount, Calif.

Figure 11:
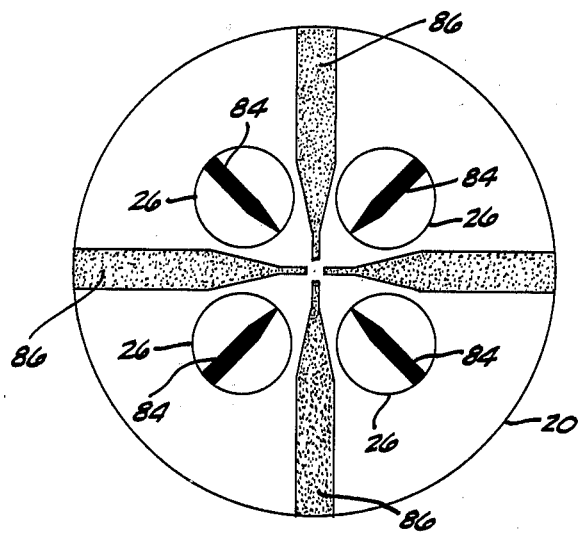
FIG. 11 is an enlarged drawing of the concentric sets of arrows of the reticle and the ends of the fiber optic strands.

So that the reticle 20 may be seen both at day and at night, it comprises as shown in FIG. 11 two concentric patterns or sets of arrows radiating from a common center and typically are transparent portions of a photographic film mounted on a glass plate with the remainder of the film opaque. However, for certain applications of the principles of this invention it may be desirable to illuminate the reticle 20 by edge lighting techniques, and in this embodiment it is preferable to use a metallic reticle deposited on the glass plate.

As clearly seen in this Figure and FIG. 5 if the first pattern 84 includes arrows each of a length substantially equal to the diameter of one fiber optic strand and the end of this strand is butted against the arrow if this pattern is displaced 45 degrees of arc from the arrows of the other pattern 86 both sets of arrows may be illuminated simultaneously, the first or night pattern 84 by the self-luminous source 24 and the other or day pattern 86 by the light admitted by the ambient light window 72. The fiber optic strands are of a size and location in the chamber 48 that they do not prevent the ambient light rays from illuminating the day pattern 86 of the reticle 20. Since the level of illumination developed by the self-luminous source 24 is of a magnitude substantially less than the level of illumination from sunlight during the day, as shown in FIG. 12, although the first pattern 84 remains illuminated it will be dominated by the illumination of the other pattern 86 and the operator will see only this pattern. However, under night conditions since the ambient light pattern 86 will not be illuminated as shown in FIG. 13 the operator clearly sees the image of the first pattern 84.

Figure 7:
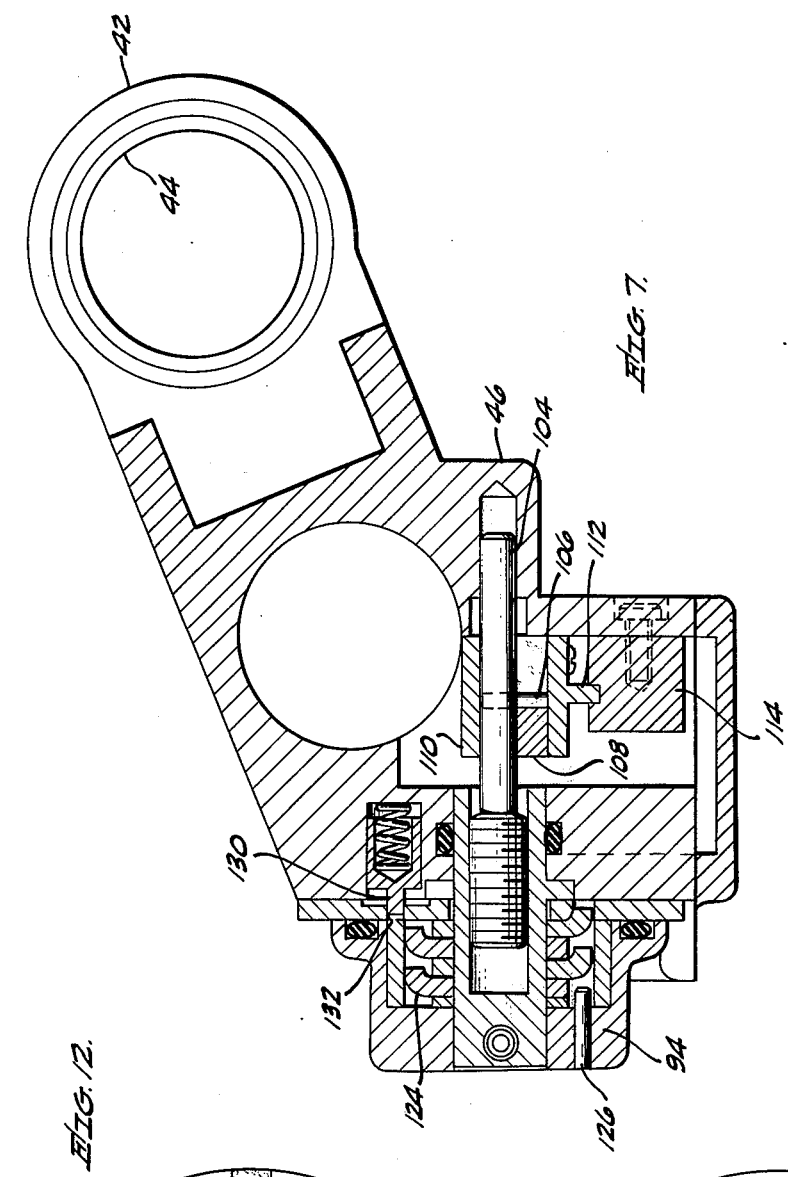
FIG. 7 is an enlarged partial sectional view of the elevation control mechanism and taken at line 7—7 in FIG. 2, with the section through the sight chamber not shown.

Referring first to the schematic drawing in FIG. 6, and then to the details in FIGS. 7 and 8, for azimuth adjustment of the reticle image in the field of view the first cantilever springs 80 are moved by an adjustment mechanism 90 including a pin 92 bearing against one of the springs and movable by a translational mechanism movable through the rotation of a knob and shaft 94. The translational mechanism includes a captured shaft 95 axially movable by the rotation of the knob and shaft 94. A block 98 is affixed to the captured shaft 95 for linear movement therewith and restrained from rotation by a rigidly held pin 100 (FIG. 5). The pin 92 extends from the block into engagement with one of the springs; and, as the block 98 moves in a direction to maintain the pin 92 in contact with the spring the reticle support frame 82 and the reticle 20 likewise move in that direction.

For elevation adjustment of the reticle a mechanism 102 somewhat similar to that of the azimuth adjustment mechanism is displaced by the rotation of a second shaft and knob 94. This mechanism includes a captured shaft 104 linearly movable by the rotation of the knob and shaft 94 and having a pin 106 extending into a cam groove 108 in a sliding block 110. The captured shaft 104 is prevented from rotation by a tab 112 engaging a rigidly supported guide 114 but is free for axial movement which through the cam groove 108 imparts to the sliding block 110 a linear movement. This movement is transmitted to the second pair of cantilever springs 76 by a rigid tube 116 and a wire link 118, (FIG. 5).

Thus, as clearly shown in FIG. 5, linear movement of the block 110 causes a corresponding up and down movement of the support ring 78 and the cantilevered end of the second pair of springs 76 supporting the ring 78. The adjustment knobs 94 are located adjacent to each other for convenience and appearance as shown in FIG. 2; however, they can be located at many other positions on the housing, such as adjacent perpendicular surfaces.

If the reticle support springs 76, 80 are assembled initially to displace the reticle support frame 82 eccentrically from a center position 120, FIG. 10, and the azimuth and elevation control mechanisms used to center the support frame 82 during adjustment under operating conditions these control mechanisms need move the reticle in the direction against the preloaded springs only, since the springs will correspondingly move the frame and reticle in the other directions. This assembly technique is clearly shown in FIG. 10 wherein the point 120 represents the center position of the reticle support frame 82.

Both of the rotational knobs and shafts of the control mechanism include a conventional rotation limiting device such as a plurality of keys 124 stackable against a pin 126 by rotation of the knob 94 and a rotation control device or detent mechanism such as a detent 130 spring loaded into engagement with a toothed surface 132. In the preferred embodiment the reticle adjustment is controlled by the detent mechanism so that one "click" is one minute of arc or the striking point of the projectile is moved one inch at a range of 100 yards. However, other degrees of adjustment may be provided or required for each specific application.

To improve the operation and stabilize the sight against fogging after the assemblage of the elements it is filled with a gas such as nitrogen. To permit this gas to fill both the sight chamber 44 and the illumination chamber 48 a port 140 extends between them.

While the basic principle of this invention has been herein illustrated along with one embodiment it will be appreciated by those skilled in the art that variations in the disclosed arrangement both as to its details and as to the organization of such details may be made without departing from the spirit and scope thereof. Accordingly, it is intended that the foregoing disclosure and the showings made in the drawings will be considered only as illustrative of the principles of the invention and not construed in a limiting sense.

What is claimed is:

1. A sighting device, comprising:
    means defining a field of view;
    first reticle means for illumination by ambient light, said first reticle means being disposed outside said field of view;
    second reticle means concentric with said first reticle means;
    self-illuminating means coupled to said second reticle means for providing continuous illumination to said second reticle means; and
    means projecting images of said first and second reticle means into said field of view.

2. A sighting device according to claim 1, comprising:
    a beamsplitter disposed in said field of view being transmissive to first predetermined wavelengths and being reflective to second predetermined wavelengths.

3. A sighting device according to claim 2, comprising:
   said self-illuminating means providing illumination having said second predetermined wavelengths.
4. A sighting device according to claim 2, comprising:
   said projecting means including lens means for forming a virtual image of said first and second reticle means on said beamsplitter means.
5. A sighting device according to claim 1, comprising:
   said second reticle means being illuminated by optical fibers coupled to said self-illuminating means.
6. A sighting device, comprising:
   means defining a field of view;
   beamsplitter means disposed in said field of view means;
   first reticle means having a first reticle pattern, said means for illumination by ambient light, said first reticle means being disposed outside said field of view;
   means for illuminating said first reticle means by ambient light;
   second reticle means having a second reticle pattern, said second reticle means being concentric with and superimposed upon said first reticle means;
   self-illuminating means coupled to said second reticle means for providing continuous illumination to said second reticle means;
   means for projecting said pattern of said first and second reticle means into said field of view; and
   focusing means for focusing said projected patterns onto said beamsplitter.
7. A sighting device according to claim 6, comprising:
   said ambient light means including a window adapted to transmit light energy from independent sources of light energy.

* * * * *